United States Patent Office 2,798,727
Patented July 9, 1957

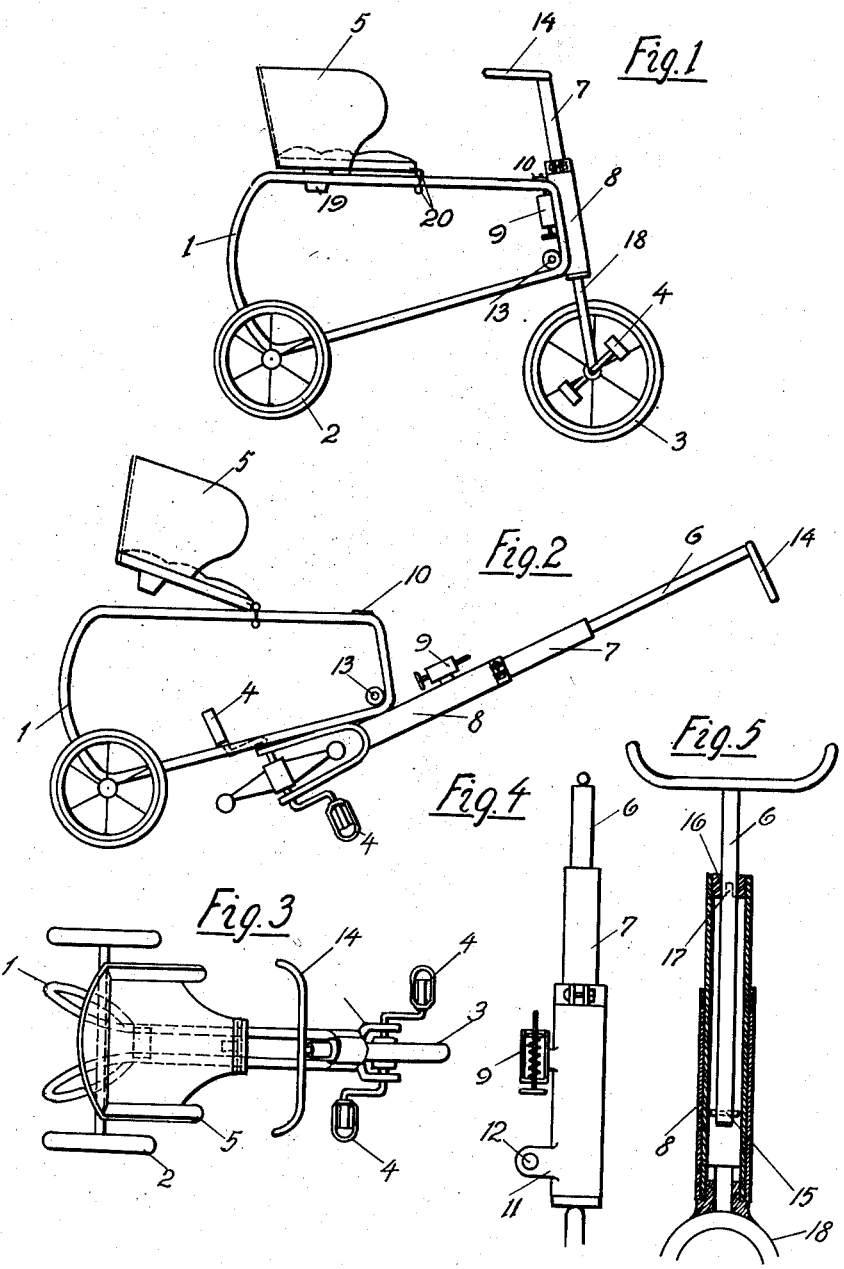

2,798,727

COMBINED TRICYCLE AND CARRIOLE

Viggo Jensen and Knud Juel Carlsen,
Laurbjerg, Denmark

Application November 12, 1953, Serial No. 391,672

5 Claims. (Cl. 280—7.17)

The present invention relates to a convertible tricycle and push-chair or go-cart for children.

After children have grown too old to ride in perambulators, they are often taken about in push-chairs or go-carts, and when they grow bigger so that they can run about they are often given tricycles. Such tricycles can sometimes be used indoors, and can also be used if the children go out for walks with adults. But if a child gets tired while out it is often necessary for the adult to carry the tricycle and sometimes also the child, which is of course both difficult and tiring, especially for a mother who has also been shopping and has parcels to carry.

An object of the present invention is to provide an improved convertible tricycle and push-chair or go-cart by means of which these inconveniences can be avoided.

According to the invention there is provided a convertible tricycle and push-chair or go-cart for children comprising a frame carrying a seat and two rear wheels, a tubular member pivotally arranged at the front of the frame, a steering rod telescopically arranged in said tubular member, a front wheel arranged below the tubular member, and means for locking the tubular member in a substantially vertical position to form a tricycle or in an inclined position with the steering rod extended as a handle to form a push-chair or go-cart. Further features of the invention can be seen from the following description and are set forth in the claims.

In the accompanying drawings a device according to the invention is illustrated by way of example, Figure 1 being a side elevation of the device when ready for use as a tricycle, partly in section, Figure 2 a side elevation of the device when ready for use as a push-chair, Figure 3 a plan corresponding to Figure 1, Figure 4 a detail in side elevation, and Figure 5 a sectional elevation corresponding to Figure 4.

The illustrated device comprises a double bow frame 1, two rear wheels 2, a front wheel 3 with pedals 4, and a seat 5 for the rider.

A steering rod 6 is telescopically arranged in a tube 7 which is surrounded by another tube 8, the latter being fastened at the front of the frame by means of a spring catch 9. The catch 9 is secured to the tube 8 between the frame bars and can be engaged in a hole 10 in a member at the front of the frame, so that in the position of Figure 1 the rider can steer by means of the handlebars 14 in the usual manner.

On the tube 8 is a lug 11, inserted between the bars at the front of the frame at the lower corner and projecting between rings 13 secured to the frame, a pivot bolt being inserted through the rings 13 and the hole 12 of the lug 11 so that the tube 8 can be pivoted about this bolt.

The steering rod 6 with its handlebars 14 can be drawn out of the tube 7 until studs 15 at the foot of the rod 6 strike a stopper 16 with a groove 17 fixed in the tube 7.

The two tubes 7 and 8 are mutually telescopically slidable and can together with the steering rod 6 be extended to form a long handle for the device when it is to be used as a push-chair or go-cart as shown in Figure 2.

There can also be welded a bush with two grooves at the end of the steering rod 6, corresponding studs being arranged at top and foot, which, when the rod is slid down or up, hold the handlebar, which can thus be adapted to both tricycle and push-chair.

The front wheel 3 is carried in a fork 18, of which the uppermost part is welded to the tube 7 and is surrounded by a bush projecting from the tube 8.

When the tricycle is to be converted into a push-chair or go-cart, this is done by releasing the spring catch 9 from the frame member 10, swinging down the steering rod 6 and the tubes 7 and 8 and locking the tube 8 in the position of Figure 2 by means of one of the pedals 4, which together with the front fork 18 and the wheel 3 are turned so that one of the pedals goes up between the frame bars and is turned by hand until at right angles to the frame bars.

The seat 5, which is kept in its place by means of a wooden wedge 19 (or a bolt placed under the seat) pressed down between the two parallel bars of the frame, can be moved by means of rollers 20, as shown in Figure 2.

Having described our invention, we claim:

1. A convertible tricycle and push-chair for children, comprising a frame, a seat and two rear wheels on the frame, a tubular member pivotally mounted at the front of the frame, a steering rod telescopically mounted in said tubular member, a front wheel provided with pedals and mounted below the tubular member, means for locking the tubular member in a substantially vertical position to form a tricycle and in an inclined position with the steering rod extended as a handle to form a push-chair, and a tube rotatably mounted in the said tubular member, said steering rod being slidably mounted within said tube, a stopper with grooves fixed in the tubular member, said steering rod being provided at the lower end with studs which on extension of the rod strike the stopper.

2. A convertible tricycle and push-chair for children, comprising a frame, a seat and two rear wheels on the frame, a tubular member pivotally mounted at the front of the frame, a steering rod telescopically mounted in said tubular member, a front wheel provided with pedals and mounted below the tubular member, means for locking the tubular member in a substantially vertical position to form a tricycle and in an inclined position with the steering rod extended as a handle to form a push-chair, a double bow frame to which the tubular member is pivotally connected, and a spring catch for locking it in place.

3. A convertible tricycle and push-chair for children, comprising a frame, a seat and two rear wheels on the frame, a tubular member pivotally mounted at the front of the frame, a steering rod telescopically mounted in said tubular member, a front wheel provided with pedals and mounted below the tubular member, and means for locking the tubular member in a substantially vertical position to form a tricycle and in an inclined position with the steering rod extended as a handle to form a push-chair, said steering rod being kept in position as the push-chair handle by one of the front wheel pedals, the front wheel being turned so that the said pedal goes up between the frame bars of the lower part of the vehicle and is retained there.

4. A convertible tricycle and push-chair for children, comprising a frame, a seat and two rear wheels on the frame, a tubular member pivotally mounted at the front of the frame, a steering rod telescopically mounted in said tubular member, a front wheel provided with pedals and mounted below the tubular member, means for locking the tubular member in a substantially vertical position to form a tricycle and in an inclined position with the steering rod extended as a handle to form a push-chair, and a seat which is kept in its place by a bolt or wooden block placed under the seat and pressed down between two parallel bars of the frame.

5. A convertible tricycle and push-chair according to claim 4, in which the seat can be moved backwards and forwards as required.

References Cited in the file of this patent

UNITED STATES PATENTS

| | | |
|---|---|---|
| 1,218,943 | Hudry | Mar. 13, 1917 |
| 1,282,433 | Kinnard | Oct. 22, 1918 |
| 1,562,367 | Sanders | Nov. 17, 1925 |

FOREIGN PATENTS

| | | |
|---|---|---|
| 852,210 | Germany | Oct. 13, 1952 |